US 6,633,417 B1

(12) United States Patent
Chang et al.

(10) Patent No.: US 6,633,417 B1
(45) Date of Patent: Oct. 14, 2003

(54) FAX MACHINE WITH A PAPER/DOCUMENT COMMON OUTPUT PATH

(75) Inventors: Yao Tsung Chang, Taipei Hsien (TW); Jui Feng Chang, Taipei Hsien (TW)

(73) Assignee: Kinpo Electronics, Inc. (TW)

( * ) Notice: Subject to any disclaimer, the term of this patent is extended or adjusted under 35 U.S.C. 154(b) by 0 days.

(21) Appl. No.: 09/374,983

(22) Filed: Aug. 16, 1999

(51) Int. Cl.$^7$ .............................................. H04N 1/04
(52) U.S. Cl. ...................................... 358/498; 358/496
(58) Field of Search ............................ 358/498, 496, 358/401, 501, 296; 271/9.02, 9.08; 399/363

(56) References Cited

U.S. PATENT DOCUMENTS

| 5,587,812 | A | * | 12/1996 | Kasuya ........................ 358/498 |
| 5,651,623 | A | * | 7/1997 | Stodder et al. .............. 358/296 |
| 5,745,246 | A | * | 4/1998 | Takaki et al. ................ 358/296 |
| 5,751,448 | A | * | 5/1998 | Kim et al. .................... 358/498 |
| 5,896,206 | A | * | 4/1999 | Kellogg ........................ 358/498 |
| 5,954,326 | A | * | 9/1999 | Gaarder et al. ............. 271/9.02 |
| 6,029,970 | A | * | 2/2000 | Hwang ........................ 271/9.08 |

* cited by examiner

*Primary Examiner*—Cheukfan Lee
(74) *Attorney, Agent, or Firm*—Bacon & Thomas, PLLC

(57) ABSTRACT

A fax machine. The fax machine includes a paper distribution unit having a document input passage with a document outlet and a paper input passage with a paper outlet, a scanner unit having a sheet-transfer gap defined between a sheet-transfer cylinder and an impression cylinder, and a switching unit operated to switch the position of the document outlet and paper outlet of the paper distribution unit. When the fax machine is at the document scanning mode, the paper distribution unit is switched by the switching unit to a first position where the document outlet is aimed at the sheet-transfer gap between the sheet-transfer cylinder and the impression cylinder. When the fax machine is at the printing mode, the paper distribution unit is switched by the switching unit to a second position where the paper outlet is aimed at the sheet-transfer gap between the sheet-transfer cylinder and the impression cylinder.

3 Claims, 4 Drawing Sheets

FAX MACHINE WITH A PAPER/DOCUMENT COMMON OUTPUT PATH

BACKGROUND OF THE INVENTION

The present invention relates to a fax machine, and more particularly to such a fax machine which has a paper/document common output path. The fax machine can be a jet-injection type or laser type fax machine.

In a regular fax machine, as shown in FIG. 7, document D is fed through a document feeding cylinder 90, a document-transfer cylinder 91 and a scanner 92, and paper P is fed through a paper-transfer cylinder 93. Because document D and paper P are delivered through a respective path, much mechanical parts are needed. This complicated arrangement requires much installation space, and greatly increase the manufacturing cost of the fax machine.

SUMMARY OF THE INVENTION

The present invention has been accomplished under the circumstances in view. It is therefore the main object of the present invention to provide a simple, inexpensive fax machine, which has a document/paper common output path. According to the present invention, the fax machine comprises a paper input unit for holding and feeding sheets of paper, the paper input unit comprising a paper tray having a guide edge for guiding out sheets of paper; a document input unit for holding and feeding document, the document input unit comprising a document tray having a guide edge for guiding out document; a paper distribution unit, the paper distribution unit comprising a document input passage and a paper input passage, the document input passage having a document inlet and a document outlet at an opposite end, the document inlet being aimed at the guide edge of the document tray, the paper input passage having a paper inlet at one end and a paper outlet at an opposite end, the paper inlet being aimed at the guide edge of the paper tray; a scanner unit, the scanner unit comprising a sheet-transfer cylinder and an impression cylinder arranged in parallel and turned relative to each other to transfer document/sheet of paper through a sheet-transfer gap defined between the sheet-transfer cylinder and the impression cylinder, and a scanning mechanism for scanning document; and a switching means operated to turn the paper distribution unit, causing the paper distribution to shift the position of the document outlet and paper outlet. When the fax machine is at the document scanning mode, the paper distribution unit is switched by the switching means to a first position where the document outlet is aimed at the sheet-transfer gap between the sheet-transfer cylinder and the impression cylinder. When the fax machine is at a printing mode, the paper distribution unit is switched by the switching means to a second position where the paper outlet is aimed at the sheet-transfer gap between the sheet-transfer cylinder and the impression cylinder. The switching means can be moved through a rotary motion or vertically reciprocating motion to shift the position of the paper distribution unit, by means of the operation of an electromagnetic valve, cam, or equivalent mechanism. Preferably, a cam is provided and turned to shift the paper distribution unit between the first position and the second position.

DETAILED DESCRIPTION OF THE PREFERRED EMBODIMENT

Figure 1:
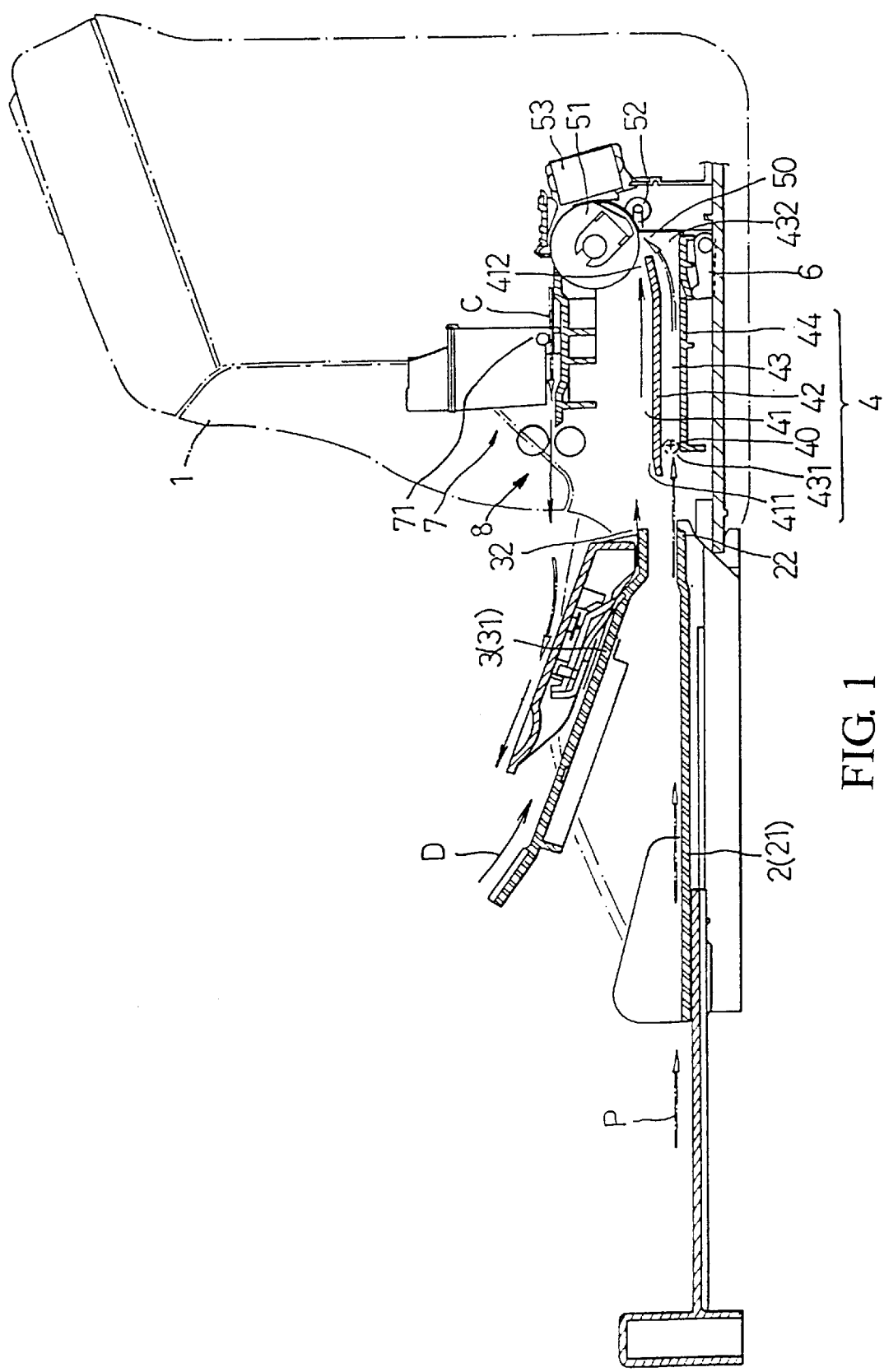
FIG. 1 is a sectional view of a fax machine according to the present invention.
Figure 2:
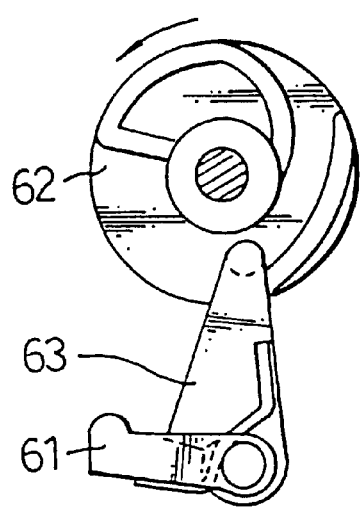
FIG. 2 illustrates the motion of the switching unit according to the present invention (Position I).
Figure 3:
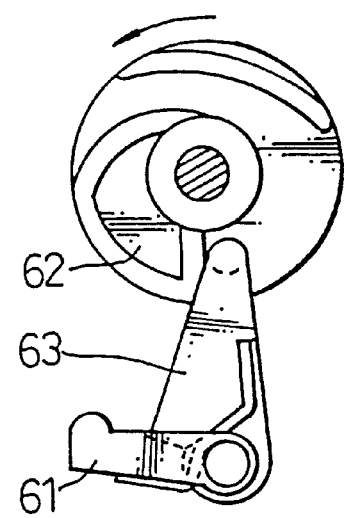
FIG. 3 illustrates the motion of the switching unit according to the present invention (Position II).
Figure 4:
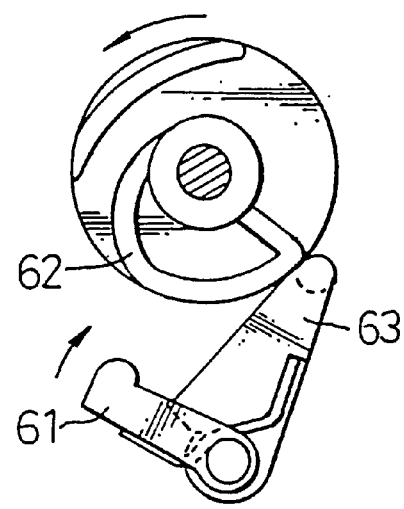
FIG. 4 illustrates the motion of the switching unit according to the present invention (Position III).

Referring to FIG. 1, a fax machine is shown comprising a housing 1, a paper input unit 2, a document input unit 3, a paper distribution unit 4, a scanner unit 5, a switching unit 6, a printer unit 7, and a paper let-off unit 8. The paper input unit 2 is mounted in the housing 1, comprising a paper tray 21 for holding sheets of paper P. The paper tray 21 has a guide edge 22 for guiding out sheets of paper P. The document input unit 3 comprises a document tray 31 for holding document D. The document tray 31 has a guide edge 32 for guiding out document D. The scanner unit 5 is mounted inside the housing 1, comprising a sheet-transfer cylinder 51 and an impression cylinder 52 arranged in parallel. A sheet-transfer gap 50 is defined between the sheet-transfer cylinder 51 and the impression cylinder 52 for the passing of document D or a sheet of paper P. The scanner unit 5 further comprises a scanning mechanism 53 for scanning document D.

The paper distribution unit 4 comprises a rotating shaft 40 pivoted to the inside of the housing 1, a partition board 42 disposed at an upper side and defining a document input passage 41, and a pressure board 44 disposed at a lower side and defining a paper input passage 43. The document input passage 41 has a document inlet 411 at one end aimed at the guide edge 32 of the document tray 31, and a.document outlet 412 at an opposite end. The paper input passage 43 has a paper inlet 431 at one end aimed at the guide edge 22 of the paper tray 21, and a paper outlet 432 at an opposite end.

Referring to FIGS. from 2 through 4, the switching unit 6 is operated to turn the paper distribution unit 4, causing it to shift the position of the document outlet 412 and paper outlet 432. The switching unit 6 comprises a cam 62, a lever 61 pivoted to the housing 1, and an actuating arm 63. The actuating arm 63 has one end coupled to the lever 61 at a fixed angle and turned with the lever 61 about a common axis, and an opposite end stopped at the periphery of the cam 62. The cam 62 is fixedly mounted on one end of the sheet-transfer cylinder 51, and synchronously rotated with the sheet-transfer cylinder 51. The lever 61 has a free end stopped at the bottom side of the pressure board 44 of the paper distribution unit 4. When rotating the cam 62, the lever. 61 is forced to lift the pressure board 44 of the paper distribution unit 4.

Figure 5:
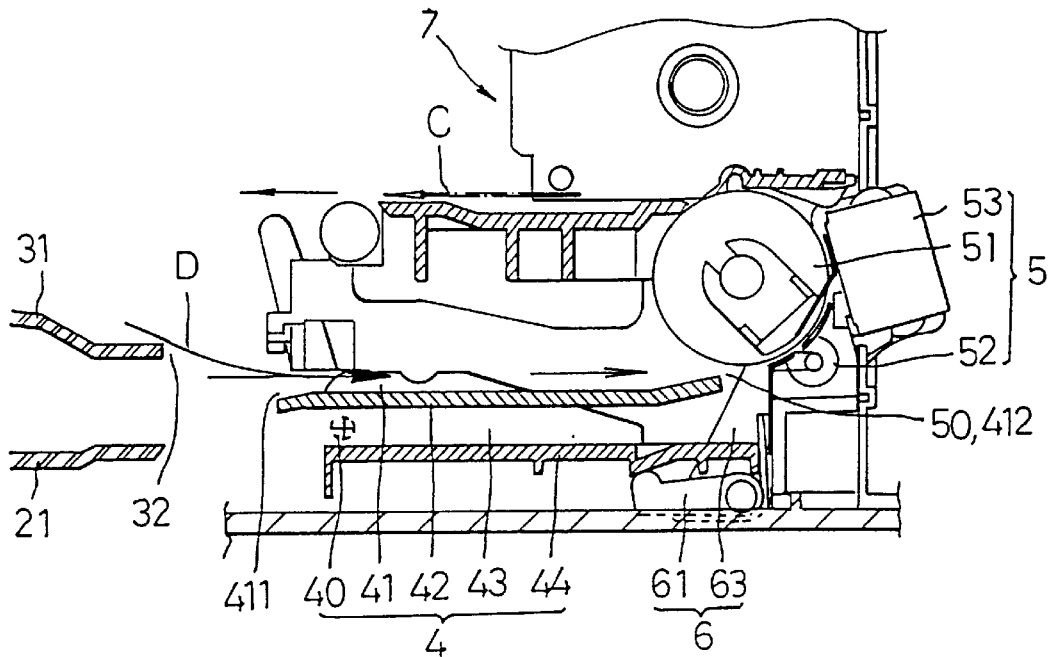
FIG. 5 is a sectional view in an enlarged scale of a part of the present invention showing the feeding of document.

FIG. 5 shows the fax machine in the document scanning mode where the paper distribution unit 4 is moved to the lower position, document D is moved through the document outlet 412 of document input passage 41 into the sheet-transfer gap 50 between the sheet-transfer cylinder 51 and the impression cylinder 52, and then moved to the paper/document common output path C, which is defined by the scanner unit 5, the printer unit 7 and the paper let-off unit 8, after having been scanned by the scanning mechanism 53.

Figure 6:
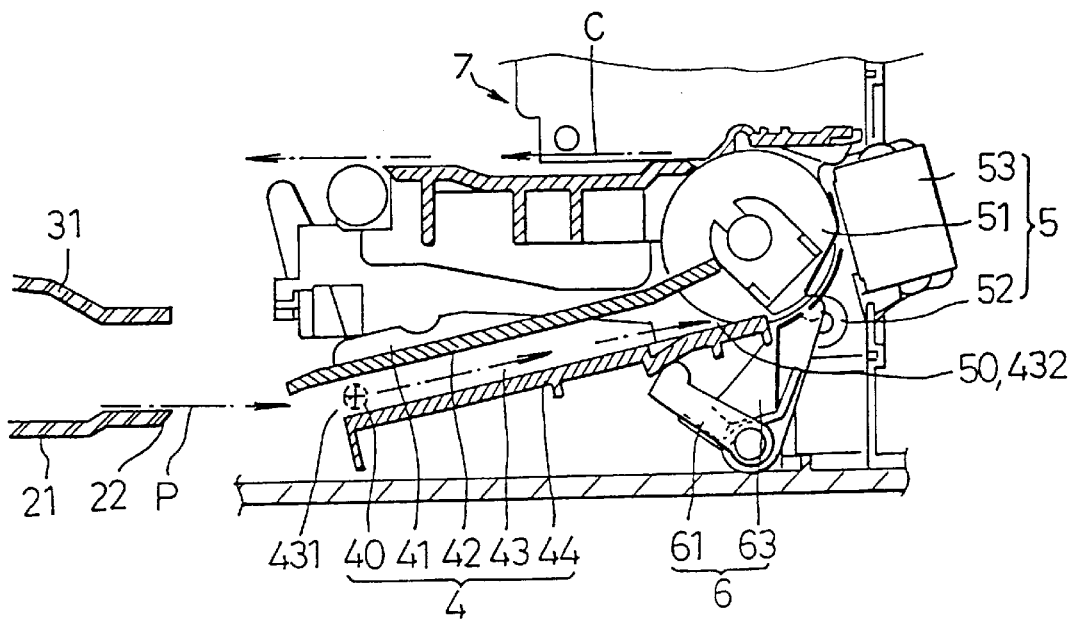
FIG. 6 is a sectional view in an enlarged scale of a part of the present invention showing the feeding of a sheet of paper.
Figure 7:
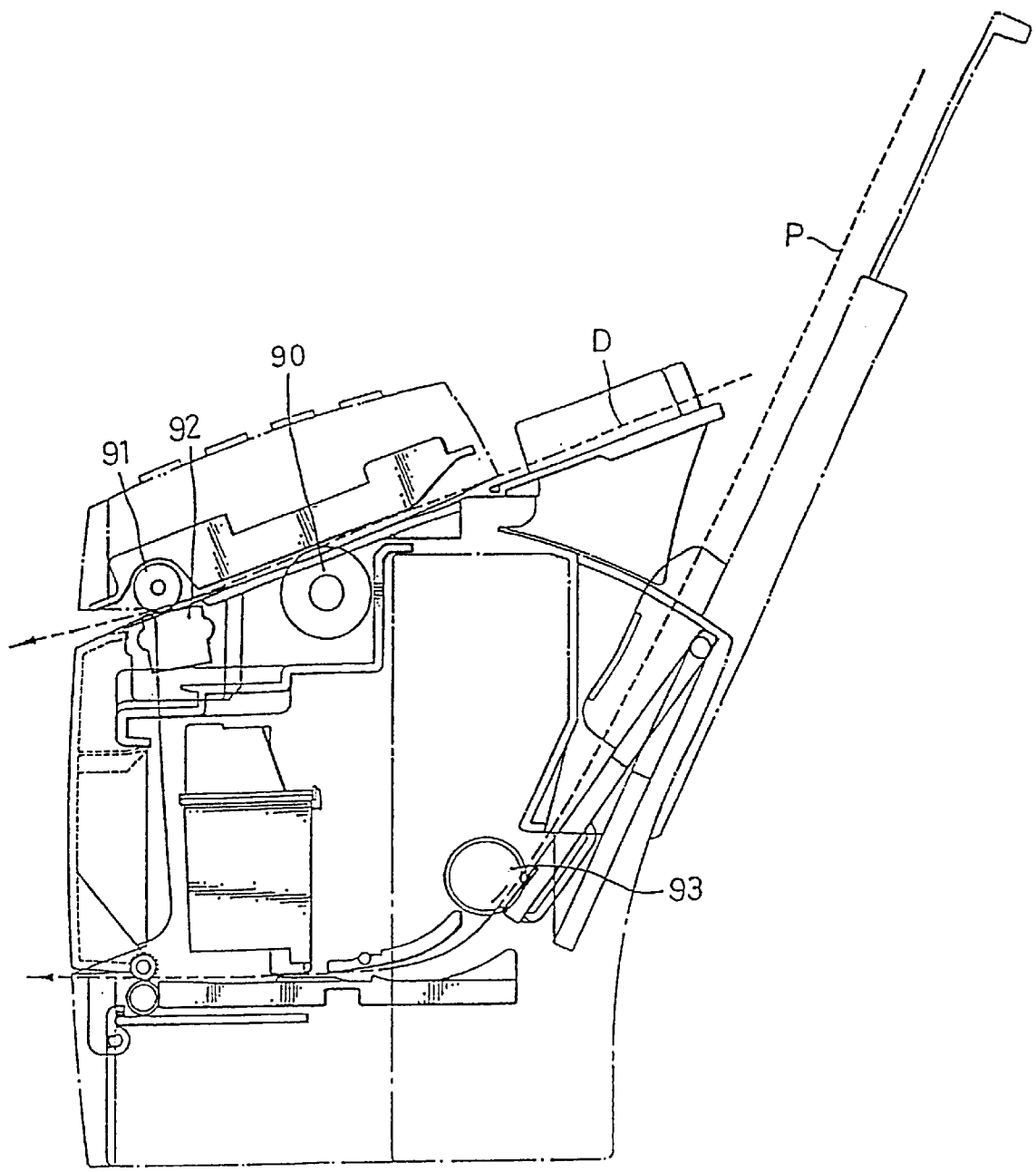
FIG. 7 illustrates the arrangement of a fax machine according to the prior art.

FIG. 6 shows the fax machine in the document printing mode where the paper distribution unit 4 is lifted by the lever 61 to aim its paper outlet 432 at the sheet-transfer gap 50 between the sheet-transfer cylinder 51 and the impression cylinder 52, and a sheet of paper P is moved from the paper input passage 43 into the sheet-transfer gap 50, then transferred by the sheet-transfer cylinder 51 to the printing head 71 of the printer unit 7 for printing, and then moved to the paper/document common output path C.

While only one embodiment of the present invention has been shown and described, it will be understood that various modifications and changes could be made there unto without departing from the spirit and scope of the invention disclosed. For example, an electromagnetic valve or any suitable reciprocating means may be used to shift the position of the paper distribution unit 4 instead of the cam 62.

What the invention claimed is:

1. A fax machine having a housing therein, comprising:

a paper input unit for holding and feeding sheets of paper, said paper input unit comprising a paper tray, said paper tray having a guide edge for guiding out sheets of paper;

a document input unit for holding and feeding document, said document input unit comprising a document tray, said document tray having a guide edge for guiding out document;

a paper distribution unit, said paper distribution unit comprising a document input passage and a paper input passage, said document input passage having a document inlet and a document outlet at an opposite end, said document inlet being aimed at the guide edge of said document tray, said paper input passage having a paper inlet at one end and a paper outlet at an opposite end, said paper inlet being aimed at the guide edge of said paper tray;

a scanner unit, said scanner unit comprising a sheet-transfer cylinder and an impression cylinder arranged in parallel and turned relative to each other to transfer document/sheet of paper through a sheet-transfer gap defined between said sheet-transfer cylinder and said impression cylinder, and a scanning mechanism for scanning document;

a switching means operated to turn said paper distribution unit, causing said paper distribution to shift the position of said document outlet and paper outlet;

wherein when the fax machine is at the document scanning mode, said paper distribution unit is switched by said switching means to a first position where said document outlet is aimed at the sheet-transfer gap between said sheet-transfer cylinder and said impression cylinder; when the fax machine is at the printing mode, said paper distribution unit is switched by said switching means to a second position where said paper outlet is aimed at the sheet-transfer gap between said sheet-transfer cylinder and said impression cylinder; and wherein said paper distribution unit comprises a rotating shaft pivoted to the inside of said housing, and said switching means comprises a lever having a fixed end pivoted to the inside of said housing and a free end stopped below said paper distribution unit for enabling said paper distribution unit to be shifted between said first position and said second position upon movement of said lever.

2. The fax machine of claim 1 wherein said switching means comprises a cam fixedly mounted said sheet-transfer cylinder at one end and synchronously rotated with said sheet-transfer cylinder, an actuating arm having one end coupled to said lever at a fixed angle and turned with said lever and an opposite end stopped at the periphery of said cam.

3. A fax machine having a housing therein, comprising:

a paper input unit for holding and feeding sheets of paper, said paper input unit comprising a paper tray, said paper tray having a guide edge for guiding out sheets of paper;

a document input unit for holding and feeding document, said document input unit comprising a document tray, said document tray having a guide edge for guiding out document;

a paper distribution unit, said paper distribution unit comprising a document input passage and a paper input passage, said document input passage having a document inlet and a document outlet at an opposite end, said document inlet being aimed at the guide edge of said document tray, said paper input passage having a paper inlet at one end and a paper outlet at an opposite end, said paper inlet being aimed at the guide edge of said paper tray;

a scanner unit, said scanner unit comprising a sheet-transfer cylinder and an impression cylinder arranged in parallel and turned relative to each other to transfer document/sheet of paper through a sheet-transfer gap defined between said sheet-transfer cylinder and said impression cylinder, and a scanning mechanism for scanning document;

a switching means operated to turn said paper distribution unit, causing said paper distribution to shift the position of said document outlet and paper outlet;

wherein when the fax machine is at the document scanning mode, said paper distribution unit is switched by said switching means to a first position where said document outlet is aimed at the sheet-transfer gap between said sheet-transfer cylinder and said impression cylinder; when the fax machine is at the printing mode, said paper distribution unit is switched by said switching means to a second position where said paper outlet is aimed at the sheet-transfer gap between said sheet-transfer cylinder and said impression cylinder; and wherein said paper distribution unit comprises a partition board disposed at an upper side and defining said document input passage, and a pressure board disposed at a lower side and defining said paper input passage.

* * * * *